(12) United States Patent
Wei

(10) Patent No.: US 7,377,435 B2
(45) Date of Patent: May 27, 2008

(54) OPTICAL ENCODER

(75) Inventor: Chih-Hsien Wei, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 281 days.

(21) Appl. No.: 11/105,513

(22) Filed: Apr. 14, 2005

(65) Prior Publication Data

US 2006/0138235 A1 Jun. 29, 2006

(30) Foreign Application Priority Data

Dec. 27, 2004 (TW) .............................. 93140744 A

(51) Int. Cl.
*G06K 7/10* (2006.01)
(52) U.S. Cl. ............ 235/454; 250/231.12; 250/231.13; 250/231.14
(58) Field of Classification Search ................ 235/454; 250/231.12, 231.13, 231.14
See application file for complete search history.

(56) References Cited

U.S. PATENT DOCUMENTS

| | | | |
|---|---|---|---|
| 3,882,482 A * | 5/1975 | Green et al. .................... 341/9 |
| 4,219,850 A * | 8/1980 | Howard ....................... 358/497 |
| 4,451,731 A | 5/1984 | Leonard |
| 4,691,101 A | 9/1987 | Leonard |
| 4,952,799 A | 8/1990 | Loewen |
| 5,317,149 A | 5/1994 | Uebbing et al. |
| 6,564,168 B1 * | 5/2003 | Hasser ....................... 702/163 |
| 7,102,123 B2 * | 9/2006 | Chin et al. ............. 250/231.13 |
| 2006/0243895 A1 * | 11/2006 | Nordenfelt et al. .... 250/231.13 |

* cited by examiner

*Primary Examiner*—Daniel A Hess
(74) *Attorney, Agent, or Firm*—Rabin & Berdo, P.C.

(57) ABSTRACT

An optical encoder is disclosed, in particular, which has a light sensing element with light-sensing cells arranged in a matrix. The light sensing element repeatedly detects the same reflective light beam by different rows of light-sensing cells to increase the precision of feedback control. Furthermore, since the light sensing element synchronously and repeatedly receives the reflective light beam, the reliability of detected signals is increased.

14 Claims, 6 Drawing Sheets

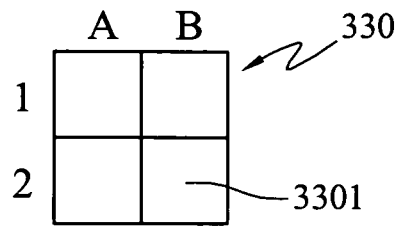
FIG.5A
|   | S1 | S2 | S3 | S4 |
|---|----|----|----|----|
| A | 0  | 0  | 1  | 1  |
| B | 0  | 1  | 1  | 0  |
FIG.5B
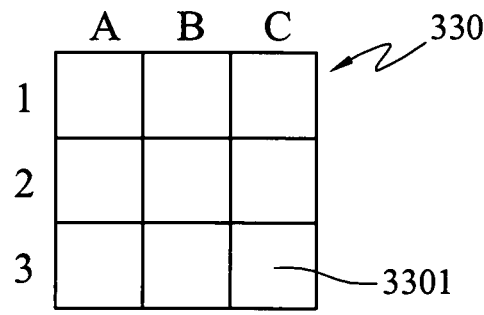
FIG.6A
|   | S1 | S2 | S3 | S4 | S5 | S6 |
|---|----|----|----|----|----|----|
| A | 0  | 0  | 0  | 1  | 1  | 1  |
| B | 0  | 0  | 1  | 1  | 1  | 0  |
| C | 0  | 1  | 1  | 1  | 0  | 0  |
FIG.6B

| | S1 | S2 | S3 | S4 | S5 | S6 | S7 | S8 |
|---|---|---|---|---|---|---|---|---|
| A | 0 | 0 | 0 | 0 | 1 | 1 | 1 | 1 |
| B | 0 | 0 | 0 | 1 | 1 | 1 | 1 | 0 |
| C | 0 | 0 | 1 | 1 | 1 | 1 | 0 | 0 |
| D | 0 | 1 | 1 | 1 | 1 | 0 | 0 | 0 |

OPTICAL ENCODER

BACKGROUND

1. Field of Invention

The invention relates to an optical encoder and, in particular, to one having a light sensing element with light-sensing cells arranged in a matrix, thereby increasing its precision and reliability.

2. Related Art

When detecting the location of a rotating device (e.g. a motor or a machine axis) or a high-speed moving device, one usually generates a binary identification code in response to each location of the detected device by the on and off of a detecting element in an optical or magnetic ways. For example, several typical optical encoders taught in the U.S. Pat. Nos. 4,451,731, 4,691,101, 4,952,799, and 5,317,149.

These encoders mainly include: a light source for emitting light, a code strip for modulating the light in response to the operation of the rotating device, such as a code wheel, an optical grating disk, or an optical scale, and a photo detector for receiving and detecting the modulated light beam. In generally, some code strips have opaque and transparent regions which are staggered. In this case, the light source and the photo detector are located on opposite sides of a measure element, i.e. the code strip. In other case, the code strips have some reflective regions, and the light source and the photo detector are located on the same side of a measure element.

Refer to FIG. 1, showing the structure of a conventional optical encoder. It is mainly comprised of a main optical grating disk 110, an auxiliary optical grating disk 120, an LED illuminator 130, a photo receiver 140, and a main axis 150. The main optical grating disk 110 is sited on the main axis 150 and driven by the main axis 150 in response to a rotating device. The main optical grating disk 110 has transparent regions 112 and opaque regions 114 which are staggered, as shown in FIG. 2. The light emitted by the LED illuminator 130 illuminates the main optical grating disk 110. Part of the light penetrates through the transparent regions 112 and reaches the photo receiver 140 via the auxiliary optical grating disk 120, while the other part of the light is blocked by the opaque regions 114. Therefore, the transparent regions 112 and opaque regions 114 which are staggered on the main optical grating disk 110 provide a basis for the photo receiver 140 to generate the binary identification code, thereby determining the location of the rotating device. However, since the light source and the photo receiver of the optical encoder are on opposite sides of the grating respectively, only one side can be used to generate codes. The resolution is thus limited and the device cannot be made too thin.

The structure of another conventional optical encoder is shown in FIG. 3. It includes: a code wheel 210, an LED illuminator 220, and a photo receiver 230. The code wheel 210 is driven by a wheel (not shown) in response to a rotating device. Moreover, the code wheel 210 has reflective regions 212 and non-reflective regions 214 which are staggered. The LED illuminator 220 illuminates the reflective regions 212 on the code wheel 210, and then the photo receiver 230 disposed on the same side as the LED illuminator 220 receives the modulated light beam directly reflected from the reflective regions 212 to obtain a binary identification code indicating the location of the code wheel 210. The location of the rotating device is thus determined for subsequent controls of the speed and stroke of the rotating device.

In the conventional optical encoder, better control precision is usually achieved by increasing its resolution. The increase of the resolution is often achieved by changing the number of transparent and opaque regions on the code strip (or the number of reflective and non-reflective regions) or by adopting several code strips and several photo detectors. However, this is likely to increase the thickness of the optical encoder, contrary to the trend of miniaturization. Moreover, errors occur when the code wheel is dirty. Therefore, the existing optical encoders need to be improved.

SUMMARY

In view of the foregoing, the present invention is to provide an optical encoder to substantially solve the problems in the prior art.

According to the invention, the precision of feedback control of the disclosed optical encoder is increased using the reflection difference between different rows of light-sensing cells.

According to the invention, multiple detections are made simultaneously to increase the reliability of detected signals of the disclosed optical encoder.

According to the invention, the errors, which are caused by the dirt on the code strip, e.g. a code wheel or optical scale, of the disclosed optical encoder are reduced.

The disclosed optical encoder comprises: a light source, a code strip, a first lens set, and a light sensing element.

The light source emits light to the code strip having reflective and non-reflective regions which are staggered. The reflective regions reflect light from the light source. The first lens set sited on the same side of the code strip as the light source converges and emits the reflected light. The light sensing element includes several light-sensing cells arranged in a matrix and opposite to the code strip on another side of the first lens set. The light-sensing cells are used to receive the light beam converged by the first lens set and convert it into an electrical signal, thereby producing a binary identification code.

The disclosed optical encoder further comprises a second lens set, which is installed between the light source and the code strip for magnifying the light from the light source to converge on the code strip.

In particular, the light sensing element has the light-sensing cells in a N1×N2 matrix, where N1 and N2 are positive integers. In this case, the light-sensing cells detects N1 channels and synchronously receive the light beam converged by the first lens set for N2 times.

BRIEF DESCRIPTION OF THE DRAWINGS

The invention will become more fully understood from the detailed description given herein below illustration only, and thus are not limitative of the present invention, wherein:

FIG. 5A is a schematic view of a first embodiment of the arrangement of the light-sensing cells in the light sensing element in FIG. 4;

FIG. 5B is a binary identification code obtained in one cycle of the electrical signal of the light sensing element in FIG. 5A;

FIG. 6A is a schematic view of a second embodiment of the arrangement of the light-sensing cells in the light sensing element in FIG. 4;

FIG. 6B is a binary identification code obtained in one cycle of the electrical signal of the light sensing element in FIG. 6A;

DETAILED DESCRIPTION OF THE INVENTION

Figure 1:
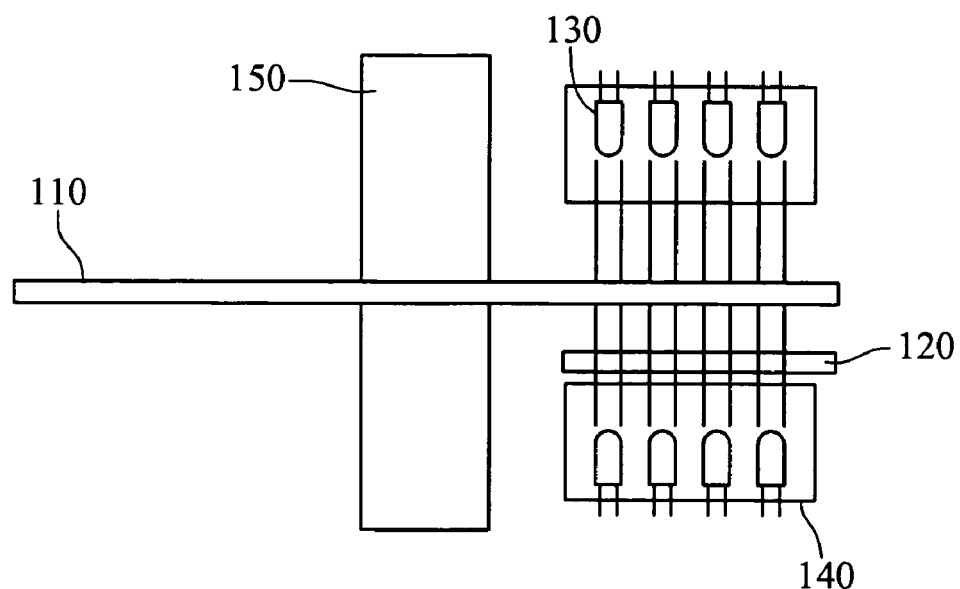
FIG. 1 is a schematic structural diagram of a conventional optical encoder.
Figure 2:
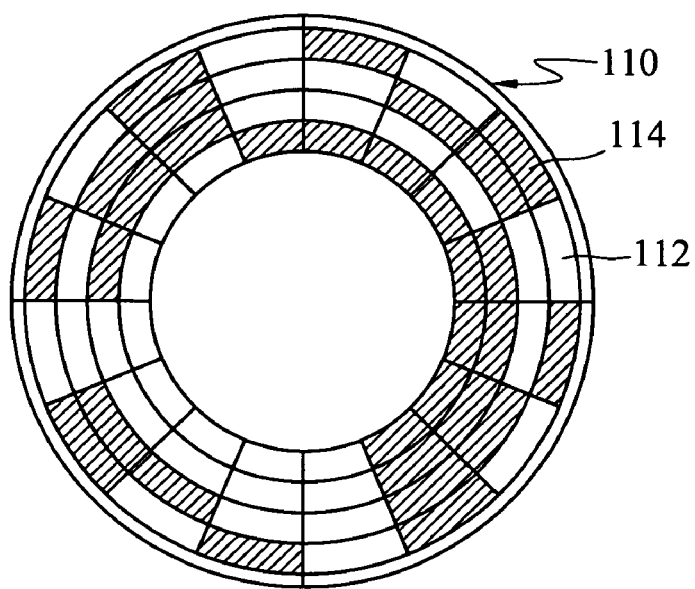
FIG. 2 is a structural diagram of the main optical grating disk in FIG. 1.
Figure 3:
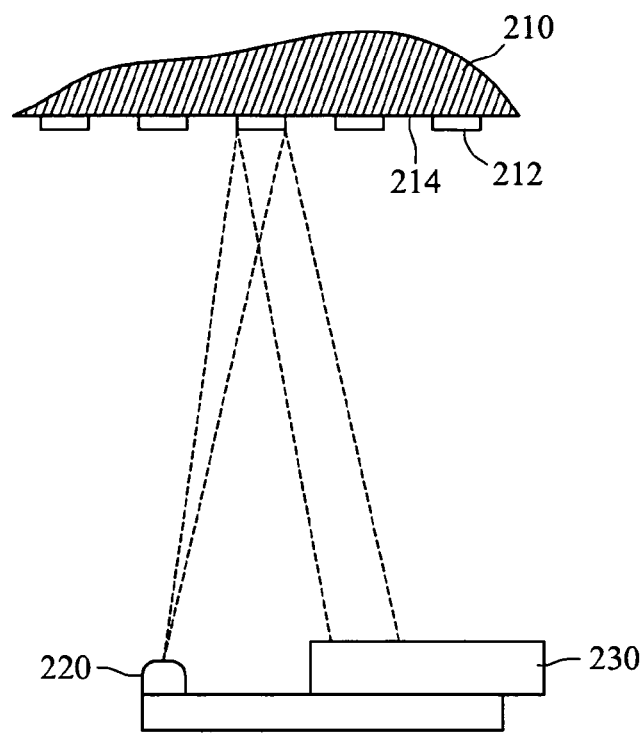
FIG. 3 is a schematic structural diagram of another conventional optical encoder.
Figure 4:
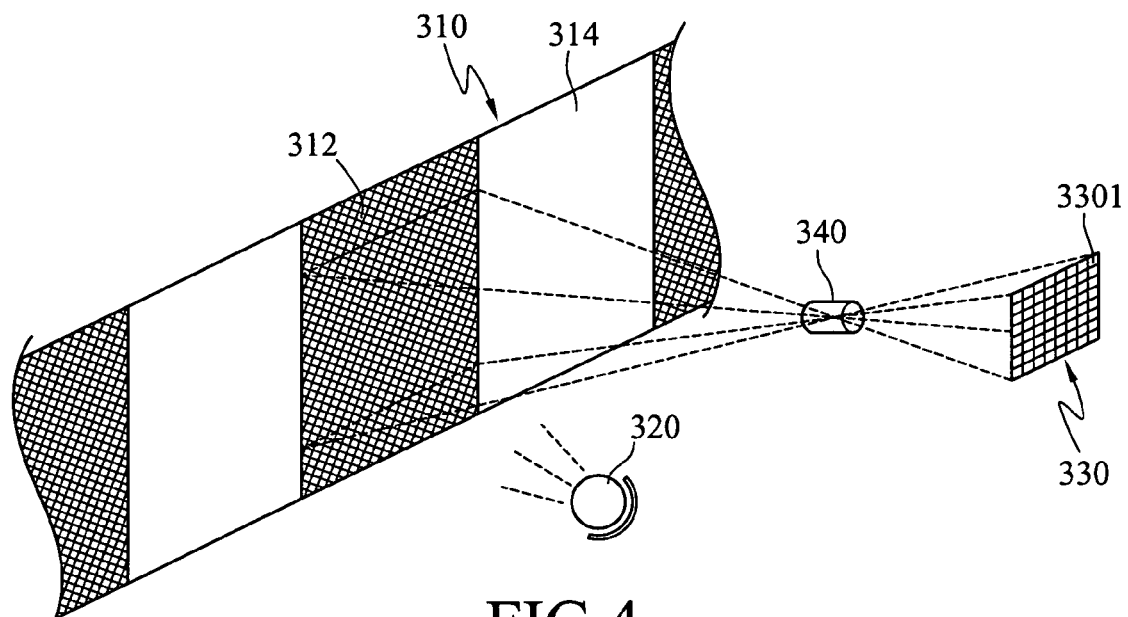
FIG. 4 is a schematic structural diagram of the optical encoder according to an embodiment of the invention.

With reference to FIG. 4, an embodiment of the optical detector comprises: a code strip 310, a light source 320, a light sensing element 330, and a first lens set 340.

The code strip 310 is driven by a wheel (not shown) in response to the rotating device. It has reflective regions 312 and non-reflective regions 314 which are staggered. The code strip 310 is such as a code wheel or an optical scale.

The light source 320 emits light to illuminate the reflective regions 312 on the code strip 310. The light source 320 is such as an LED illuminator.

The light sensing element 330 disposed on the same side of the code strip 310 as the light source 320 receives the modulated light beam reflected by the reflective regions 312 and converts it into an electrical signal, thereby producing a binary identification code to determine the location of the rotating device for controlling the speed and stroke of the rotating device.

The light detecting element 330 has several light-sensing cells 3301 arranged in a matrix. The vertical lines of the light-sensing cells are used to distinguish the channels of different code strips 310. That is, the light-sensing cells on each vertical line detect the signal of the previous channel on the code strip 310. Therefore, the same feedback control is achieved by a low-resolution code strip 310 (e.g. a paper optical scale). Moreover, the reliability is increased by comparing the light-sensing cells on the horizontal lines, thereby preventing errors caused by a dirty code strip 310. The width of the reflective and non-reflective regions is smaller or roughly equal to the width of which the image is read by the light sensing element each time. That is, it is that the width of the light sensing element multiplied by the number of rows.

The first lens set 340 is installed between the code strip 310 and the light sensing element 330 to converge the modulated light beam reflected by the reflective regions 312 to transmit to the light sensing element 330. As shown in FIG. 4, the first lens has a first refractive interface and a second refractive interface opposite to the first refractive interface.

In the following, the relation between the composition of the light sensing element and the code strip precision is described, with reference to appropriate drawings.

FIG. 5A shows the arrangement of the light-sensing cells in the light sensing element according to an embodiment of the invention. In this case, the light-sensing cells are disposed in a 2×2 matrix. In terms of vertical lines, vertical line A and vertical line B detect the modulated light beam in different channels to obtain a two-digit binary identification code. When a code strip of an appropriate length is used, the four binary identification code S1~S4 is obtained in one cycle of its electrical signal, as shown in FIG. 5B. In terms of horizontal lines, horizontal line 1 and horizontal line 2 are used to detect repeatedly the same channel to increase the reliability of signals.

Suppose the light-sensing cells in the light sensing element are disposed in a 3×3 matrix, as shown in 6A. In terms of vertical lines, vertical lines A, B, and C detect the modulated light beam in different channels to obtain a three-digit binary identification code. With a code strip of an appropriate length, the six binary identification code S1~S6 is obtained in one cycle of its electrical signal, as shown in FIG. 6B. In terms of horizontal lines, horizontal lines 1, 2, and 3 are used for repeated detections.

Figures 7A, 7B:
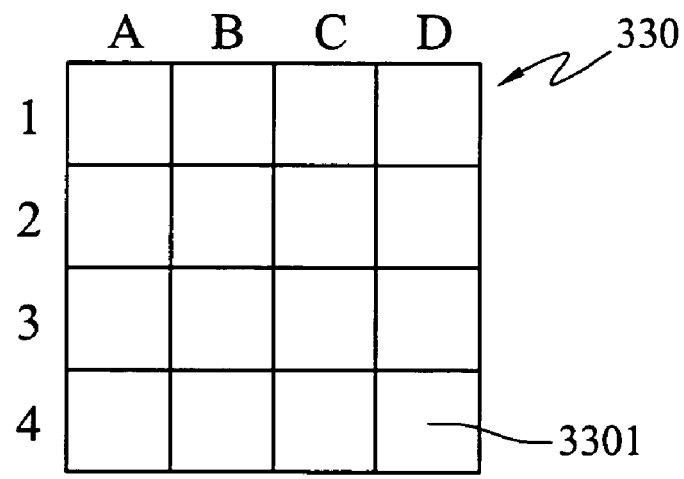
FIG. 7A is a schematic view of a third embodiment of the arrangement of the light-sensing cells in the light sensing element in FIG. 4.
FIG. 7B is a binary identification code obtained in one cycle of the electrical signal of the light sensing element in FIG. 7A.

Likewise, suppose the light-sensing cells in the light sensing element are disposed in a 4×4 matrix, as shown in 7A. In terms of vertical lines, vertical lines A, B, C, and D detect the modulated light beam in different channels to obtain a four-digit binary identification code. With a code strip of an appropriate length, the eight binary identification code S1~S8 is obtained in one cycle of its electrical signal, as shown in FIG. 7B. In terms of horizontal lines, horizontal lines 1, 2, 3, and 4 are used for repeated detections.

Figures 8A, 8B:
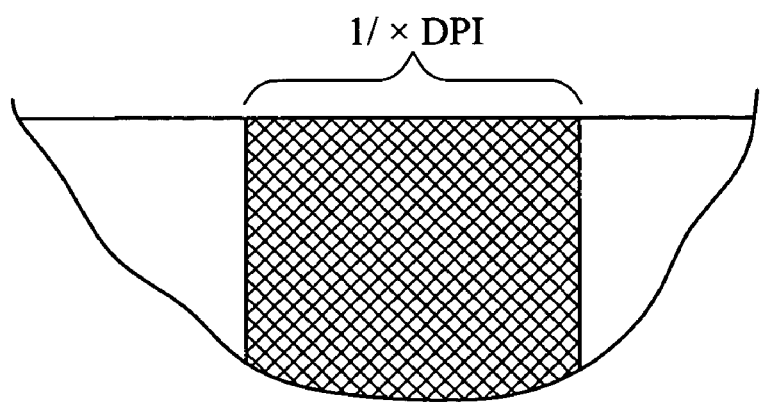
FIG. 8A is a schematic view of a fourth embodiment of the arrangement of the light-sensing cells in the light sensing element in FIG. 4.
FIG. 8B is a schematic view of the code strip in the light sensing element of FIG. 8A.

In summary, the light-sensing cells in the light sensing element is disposed in an N1×N2 matrix, as shown in 8A, where N1 and N2 are positive integers. Suppose the resolution of the code strip is 1/X DPI and the light sensing element has the configuration of an N1×X matrix, as shown in FIG. 8B. Therefore, the detection precision is N1×X, and the number of times for a synchronization detector is N2. A preferred embodiment of the light sensing element is a charge coupled device (CCD), a complementary metal oxide semiconductor (CMOS) image sensor, or a contact image sensor (CIS). Here, X represents the number of reflective and non-reflective regions in one unit.

Figure 9:
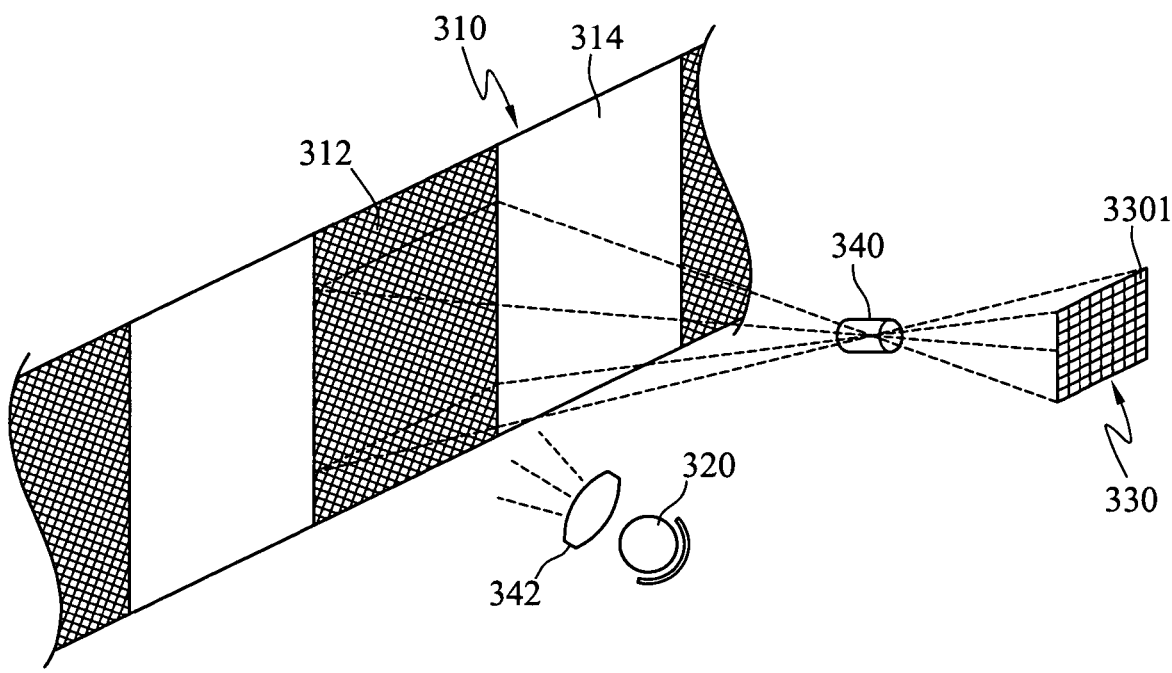
FIG. 9 is a schematic structural diagram of the optical encoder according to another embodiment of the invention.

Further, a second lens set 342 is installed between the code strip 310 and the light source 320 to magnify the light from the light source 320, and converge the magnified light beam on the code strip 310, as shown in FIG. 9.

Certain variations would be apparent to those skilled in the art, which variations are considered within the spirit and scope of the claimed invention.

What is claimed is:

1. An optical encoder, comprising:
   a light source, which emits light;
   a code strip, which has reflective regions and non-reflective regions which are staggered, wherein the reflective regions reflect the light from the light source to produce a reflective light beam;
   a first lens set, which is disposed on the same side of the code strip as the light source, and which converges the light beam and transmits the converged light beam; and
   a light sensing element, which has a plurality of light sensing cells arranged in an N1×N2 matrix with N1 and N2 being integers greater than 1, and which receives the light beam converged by the first lens set and converts the received light beam into an electrical signal, thereby obtaining a binary identification code, wherein the light sensing element is opposite to the code strip and installed on another side of the first lens set, the light-sensing cells detecting N1 channels of the code strip and synchronously receiving the light beam converged from different portions of the reflective regions by the first lens set N2 times.

2. The optical encoder of claim 1, further comprising a second lens set installed between the light source and the code strip for magnifying the light generated by the light source to converge the magnified light on the code strip.

3. The optical encoder of claim 1, wherein the width of reflective and non-reflective regions is the width of image read by the light sensing element.

4. The optical encoder of claim 1, wherein the light sensing element is a charge coupled device (CCD).

5. The optical encoder of claim 1, wherein the light sensing element is a complementary metal oxide semiconductor (CMOS) image sensor.

6. The optical encoder of claim 1, wherein the light sensing element is a contact image sensor (CIS).

7. The optical encoder of claim 1, wherein the light source is an LED illuminator.

8. The optical encoder of claim 1, wherein the code strip is a code wheel.

9. The optical encoder of claim 1, wherein the code strip is an optical scale.

10. An optical encoder, comprising:
   a light source to emit light;
   a code strip, having reflective regions and non-reflective regions which are staggered, wherein the reflective regions reflect the light from the light source to produce a reflective light beam;
   a first lens set disposed on the same side of the code strip as the light source to converge the light beam and transmit the converged light beam, the first lens set having a first refractive interface and a second refractive interface; and
   a light sensing element opposite to the code strip and installed on another side of the first lens set, having an N1×N2 matrix of light sensing cells with N1 and N2 being integers greater than 1, the light-sensing cells detecting N1 channels of the code strip and synchronously receiving the light beam converged from different portions of the reflective regions by the first lens set N2 times to increase reliability of signals, wherein the reflective light beam from the reflective regions is converged by passing through the first refractive interface and the second refractive interface of the first lens set and received by the light sensing element to convert the light beam into an electrical signal, thereby the light sensing element obtaining a binary identification code.

11. The optical encoder of claim 10, further comprising a second lens set installed between the light source and the code strip for magnifying the light generated by the light source to converge the magnified light on the code strip.

12. The optical encoder of claim 10, wherein the width of the reflective and non-reflective regions is the width of image read by the light sensing element.

13. An optical encoder, comprising:
   a light source to emit light;
   a code strip, having reflective regions and non-reflective regions which are staggered, the reflective region wherein the reflective regions reflect the light from the light source to produce a reflective light beam;
   a first lens set disposed on the same side of the code strip as the light source to converge the light beam and transmit the converged light beam; and
   light sensing element opposite to the code strip and installed on another side of the first lens set, having an N1×N2 matrix of light sensing cells with N1 and N2 being integers greater than 1, the light-sensing cells detecting N1 channels of the code strip and synchronously receiving the light beam converged from different portions of the reflective regions by the first lens set N2 times to increase reliability of signals, the width of the reflective regions is equal to the width of image read by the light sensing element, wherein the reflective light beam is converged by the first lens set and received by the light sensing element to convert the light beam into an electrical signal, thereby obtaining a binary identification code.

14. The optical encoder of claim 13, further comprising a second lens set installed between the light source and the code strip for magnifying the light generated by the light source to converge the magnified light on the code strip.

* * * * *